United States Patent
Radominski et al.

(10) Patent No.: US 7,506,985 B2
(45) Date of Patent: Mar. 24, 2009

(54) PROJECTION LIGHT SOURCE HAVING MULTIPLE LIGHT EMITTING DIODES

(75) Inventors: George Z. Radominski, Corvallis, OR (US); Charles Otis, Corvallis, OR (US); Chris Carl Aschoff, Corvallis, OR (US); Patrick V. Boyd, Corvallis, OR (US); Eugene W. Oliver, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 326 days.

(21) Appl. No.: 11/259,202

(22) Filed: Oct. 26, 2005

(65) Prior Publication Data

US 2007/0091281 A1    Apr. 26, 2007

(51) Int. Cl.
*G03B 21/28* (2006.01)
*G03B 21/20* (2006.01)

(52) U.S. Cl. .............. 353/94; 353/31; 353/99; 362/231; 362/241; 362/800

(58) Field of Classification Search ........... 353/38, 353/94, 98, 99, 31, 37; 362/19, 555, 561, 362/227, 231, 234, 236, 241, 250, 800
See application file for complete search history.

(56) References Cited

U.S. PATENT DOCUMENTS

| | | | |
|---|---|---|---|
| 5,838,247 A | 11/1998 | Bladowski | |
| 6,335,786 B1 | 1/2002 | Shiraishi | |
| 6,834,963 B2 | 12/2004 | Kim et al. | |
| 6,857,762 B2 * | 2/2005 | Shimokawa et al. | 362/245 |
| 6,916,097 B2 * | 7/2005 | Omoda et al. | 353/31 |
| 7,073,922 B2 * | 7/2006 | Monjo et al. | 362/232 |
| 7,083,288 B2 * | 8/2006 | Yamanaka | 353/94 |
| 7,101,050 B2 * | 9/2006 | Magarill et al. | 353/97 |
| 7,220,021 B2 * | 5/2007 | Wang et al. | 362/247 |
| 7,237,909 B2 * | 7/2007 | Yokote et al. | 353/94 |
| 7,252,392 B2 * | 8/2007 | Matsui | 353/85 |
| 7,322,705 B2 * | 1/2008 | Imade et al. | 353/94 |
| 2002/0191395 A1 | 12/2002 | Fleury | |
| 2003/0214691 A1 | 11/2003 | Magno et al. | |
| 2004/0036990 A1 | 2/2004 | Hanano | |
| 2004/0090602 A1 * | 5/2004 | Imade | 353/102 |
| 2005/0024602 A1 * | 2/2005 | Shimaoka et al. | 353/94 |
| 2005/0116928 A1 | 6/2005 | Bohn et al. | |

(Continued)

FOREIGN PATENT DOCUMENTS

EP    1427200    9/2004

(Continued)

OTHER PUBLICATIONS

Publication entitled "Wide Field Collimator 2 (WFC2) for GOES Imager and Sounder", published Jan. 1, 2004; Authors Etemad, et al., United States.

(Continued)

*Primary Examiner*—William C Dowling

(57) ABSTRACT

A light source comprises a plurality of light emitting diodes arranged around the perimeter of a reflective optical element, wherein each of the light emitting diodes selectively generates a light beam directed to the reflective optical element. The reflective optical element generates a light path by collimating and reflecting the selectively generated light beams from each of the light emitting diodes.

27 Claims, 4 Drawing Sheets

U.S. PATENT DOCUMENTS

2005/0117130 A1   6/2005   Bohn et al.
2005/0128730 A1   6/2005   Shindoh
2007/0127240 A1*  6/2007   Inamoto .................... 362/242

FOREIGN PATENT DOCUMENTS

| | | | |
|---|---|---|---|
| EP | 1 466 807 | A | 10/2004 |
| EP | 1 508 740 | A | 2/2005 |
| JP | 1008491 | | 1/1989 |
| WO | WO/03/101156 | | 12/2003 |

OTHER PUBLICATIONS

Publication entitled "A LED Light unit for the projector", published Jun. 2005; Author Inst. of Opt. Eng., Shanghai Jiao Tong Univ., China; publisher: Science Press.

* cited by examiner

PROJECTION LIGHT SOURCE HAVING MULTIPLE LIGHT EMITTING DIODES

BACKGROUND

In a projection system, an image-bearing light beam is generated from a light engine and ultimately cast onto a viewing surface. Light engines commonly include a light source, a means for generating color (e.g., a color wheel), and a light modulator, which modulates the light beam before projecting a resultant image onto the viewing surface. To generate a light beam, a light source typically includes a mercury lamp or a plurality of light emitting diodes (LEDs). Although mercury lamps have long been a reliable light source, their size and inability to produce adequate light in the upper wavelengths of the visible range make them less suitable for modern projection systems. LEDs, on the other hand, provide a reliable and less expensive alternative to using mercury lamps. The problem, however, is that LEDs generally produce unfocused and undirected light that is difficult to converge and direct.

In addition, light sources generally require a color wheel, or other subtractive color device, wherein colored light is produced by filtering white light. With respect to color wheels in particular, there are also moving parts, which are disadvantageous from a maintenance standpoint.

The embodiments described hereinafter were developed in light of these and other drawbacks associated with known light source configurations.

BRIEF DESCRIPTION OF THE DRAWINGS

The present embodiments will now be described, by way of example, with reference to the accompanying drawings, in which.

DETAILED DESCRIPTION

An improved light source for a projection system is provided. The light source generally includes a plurality of multi-colored light emitting diodes (LEDs) arranged around the perimeter of a centrally located reflective optical element. In one embodiment, the LEDs are arranged along the inner circle of a ring. Light beams emitted from the LEDs are directed inward to the centrally located reflective optical element that collimates the LED light beams into a focused light path. By controlling the duty cycle of the LEDs, the light output including the brightness and intensity of the LEDs is maintained while reducing the amount of excess heat generated by the light source. However, when excessive heat is produced, the planar configuration of the LED arrangement, in combination with the material properties of the ring, allows for excess heat to be easily transferred away from the light source, or dissipated through the ring.

Alternatively, the LEDs can be arranged around the perimeter of the reflective optical element without the ring at an appropriate angle of incidence between the light emitted from the LEDs and the surface of the reflective optical element.

In one embodiment, the reflective optical element is a multi-faceted optical element configured to re-align the LED light beams into co-linear and co-pointed light paths. In another embodiment, the reflective optical element is a single-sided rotary optical element that rotates about a central axis of a ring. As the reflective optical element is rotated about the central axis, the LEDs around the perimeter of the ring are pulsed in conjunction with the rotation of the reflective optical element such that the LEDs are pulsed as the reflective surface of the optical element is in alignment with each LED.

Figure 1:
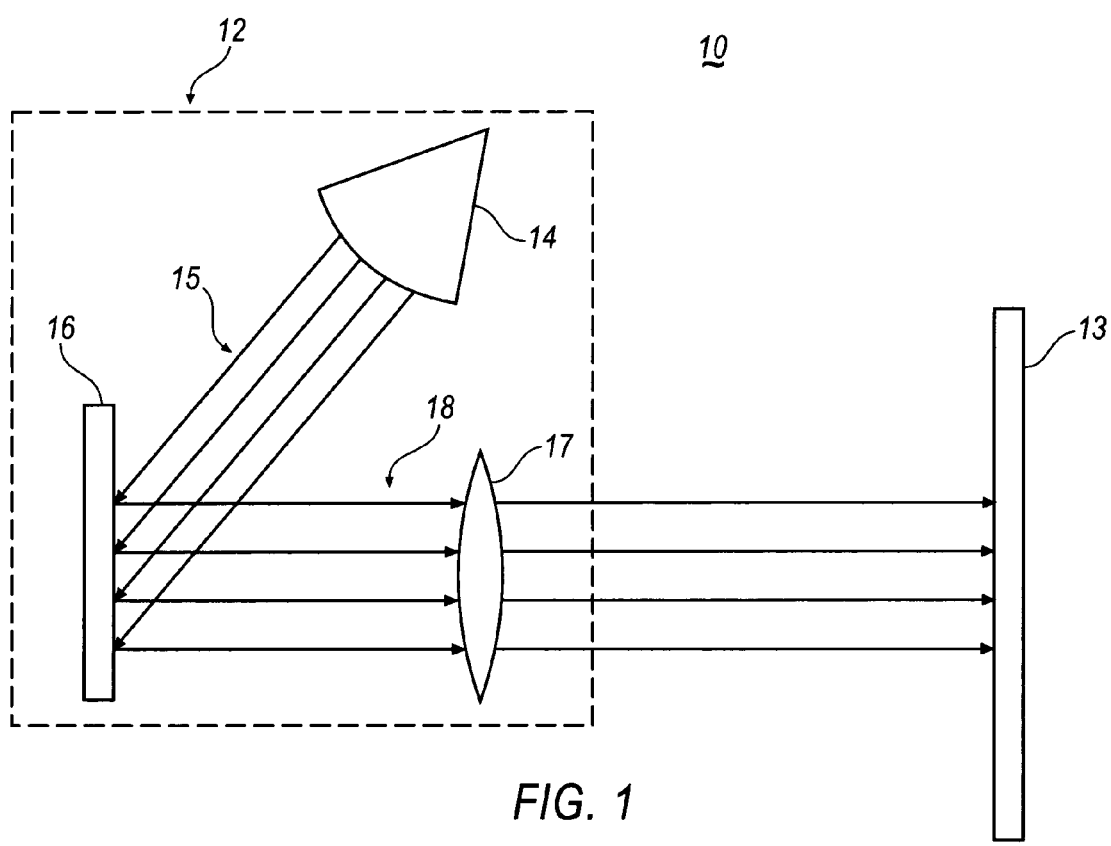
FIG. 1 illustrates an exemplary projection system.

FIG. 1 illustrates an exemplary projection system 10 including a light engine 12 and a viewing surface 13. The light engine 12 generally includes a light source 14, a light modulator 16, and a set of projection optics 17. Light source 14 projects a light beam 15 onto the surface of the light modulator 16, which in general comprises an array of pixel elements that are configured to modulate incoming light beam 15. A resultant modulated light beam 18 is further projected through the set of optics 17 and ultimately impinges upon viewing surface 13.

Figure 2A:
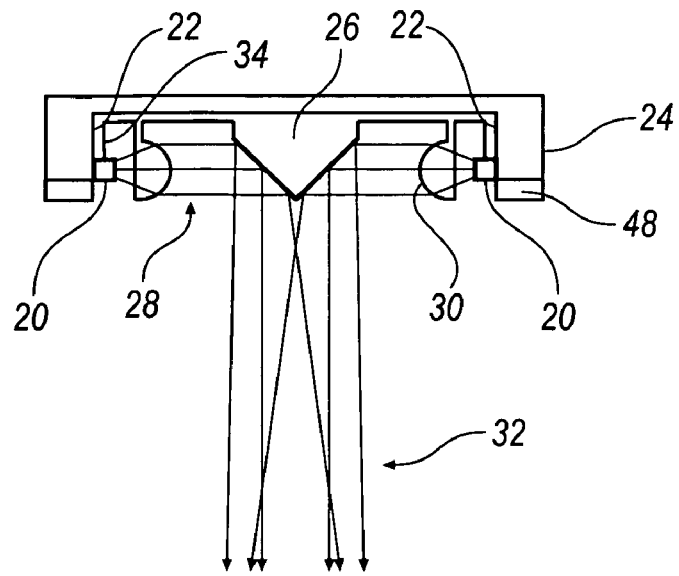
FIG. 2A is a side view of an exemplary light source according to an embodiment.
Figure 2B:
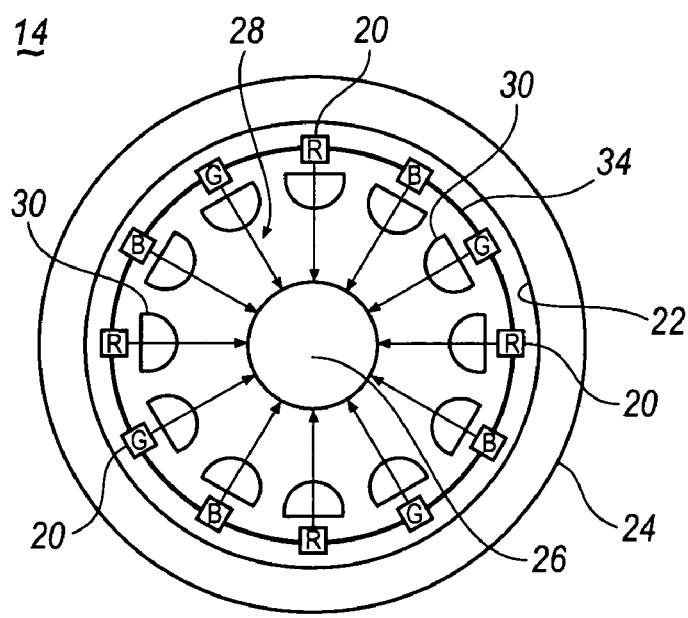
FIG. 2B is a top view of an exemplary light source according to FIG. 2A.

An enlarged side and top view of an exemplary light source 14 is shown in FIGS. 2A and 2B, respectively. Light source 14 includes a plurality of LEDs 20 mounted to an inner surface 22 of a ring 24. The LEDs 20 are directed inward to a reflective optical element 26 centrally located within the ring 24. Light beams 28 from each of the LEDs 20 are transmitted through a lens 30 to the reflective optical element 26. The light beams 28 are collimated at the reflective optical element 26 and are reflected into a co-linear and co-pointed light path 32. Light source 14 further includes a reflective surface 34 that is adjacent to the LEDs 20 along the inner surface 22 of the ring 24. The reflective surface 34 is configured to re-direct stray light from the LEDs 20 back into the lens 30 and out to the reflective optical element 26.

In an exemplary embodiment, light source 14 includes at least three LEDs 20; one red, one green, and one blue. Alternatively, there will be a plurality of LEDs 20 in varying combinations of red, green, and blue. For example, FIG. 2B illustrates light source 14 of FIG. 2A with four red (R), four green (G), and four blue (B) LEDs. One of ordinary skill in the art understands, however, that any number of LED 20 combinations may be used in other embodiments of the invention. For example, another embodiment (not shown) may have forty red, fifteen green, and twenty blue LEDs 20. The number of LEDs 20 and distribution of color depends on a given projection system's design criteria. In yet another embodiment (not shown), there may be multiple layers of LEDs along the inner surface 22 of the ring 24. The layers of LEDs may be stacked on top of one another, or may be staggered apart from one another between the layers of LEDs.

The ring 24 of light source 14 is constructed primarily of copper and is configured to distribute and dissipate excess heat that may be generated from the LEDs 20. One of ordinary skill in the art understands that a variety of materials are suitable for the ring 24, including all electrically conductive metals, polymers, and ceramics. In addition to the heat dissipating properties of the material comprising the ring 24, the planar configuration (shown in FIG. 2B) of the LEDs on the ring 24 advantageously simplifies other heat transfer solutions such as conductive and convective thermal management schemes that include the use of pins, fins, fans, thermoelectric coolers, heat pipes, and combinations thereof, to draw away excess heat.

Figure 3A:
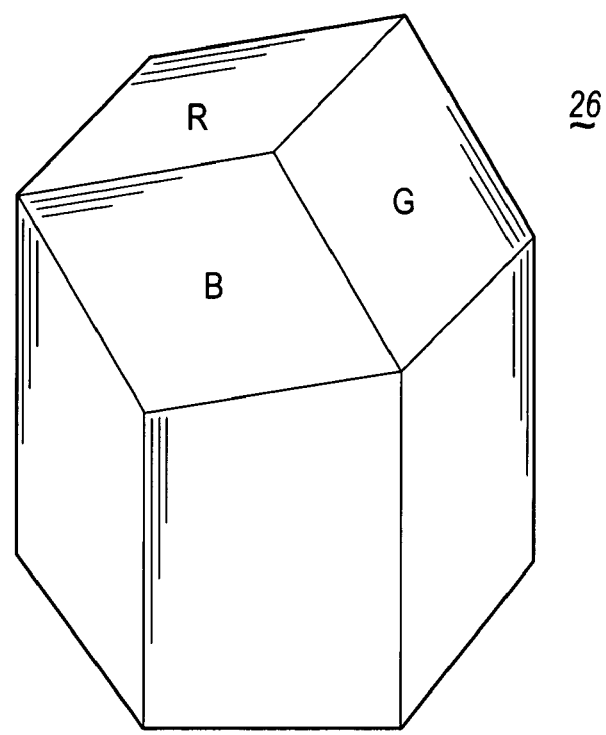
FIG. 3A illustrates an exemplary reflective optical element according to an embodiment.
Figure 3B:
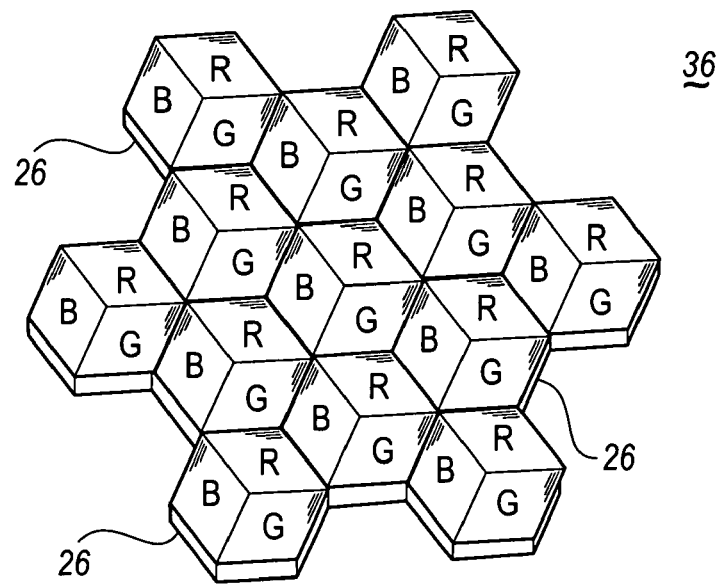
FIG. 3B illustrates an array of exemplary reflective optical elements according to the reflective optical element of FIG. 3A.

The reflective optical element 26 of FIG. 2A is generally made from a single plastic molding with coated reflective surfaces. In one embodiment, as shown in FIG. 3A, the reflective optical element 26 is multi-faceted with three reflective surfaces, one for each of the three primary LED colors, red (R), green (G), and blue (B). In another embodiment, as shown in FIG. 3B, a plurality of multi-faceted optical elements 26 are fixed together to form an array of reflective optical elements 36.

Figure 3C:
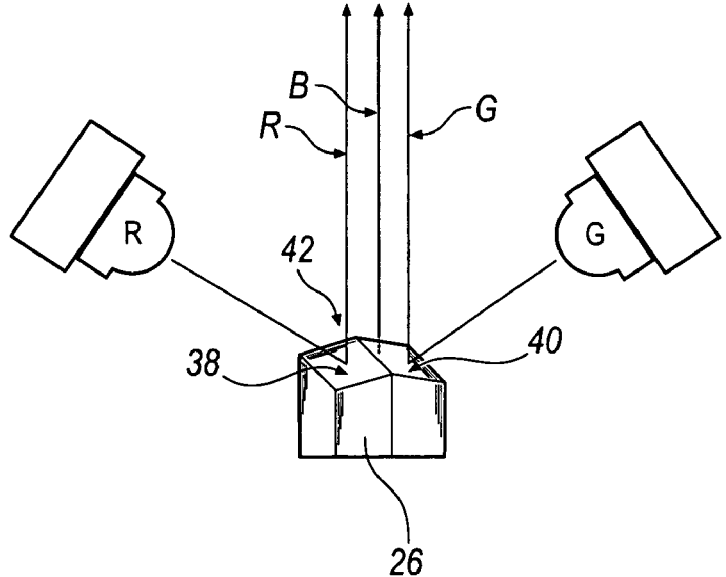
FIG. 3C illustrates a side view of an exemplary light source implementing the reflective optical element of FIG. 3A.

In another embodiment, FIG. 3C illustrates an exemplary light source 14 incorporating the reflective optical element 26 of FIG. 3A, wherein the three reflective surfaces are mirrors 38, 40, and 42 (surface 42 is indicated as adjacent to surfaces 38 and 40, but is not physically shown in FIG. 3C). Light source 14 further includes three LEDs, one for each primary color light beam red (R), green (G), and blue (B) (blue LED is not shown in FIG. 3C). By choosing the correct angles for each of the mirrors 38, 40, and 42 in reflective optical element 26, the primary light beams R, G, and B that are reflected from the surface of the mirrors 38, 40, and 42 are co-axial and co-pointed. The correct angle of the mirrors 38, 40, and 42 also enables each primary light beam R, G, and B to see only its own facets with no shadowing from other facets. Moreover, the reflective surfaces can be designed in accordance with a particular light modulator 16 (shown in FIG. 1) such that the resultant light beams R, G, and B, can be tailored to the requirements of a given light modulator 16. For example, some light modulators 16 require the incoming light to be converging while other light modulators 16 require the incoming light to be parallel.

Figure 4:
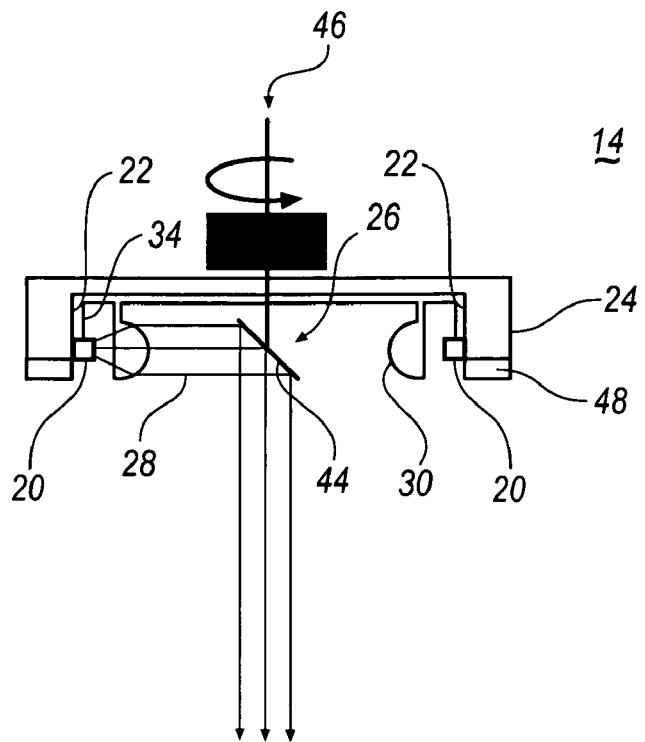
FIG. 4 is a side view of another exemplary light source according to an embodiment.

In yet another embodiment, the reflective optical element 26 as shown in FIG. 4, has a single reflective surface 44 that rotates about a central axis 46. In this configuration, the LEDs 20 are pulsed according to the rotation of the reflective optical element 26. In this way, each LED 20 on the ring 24 is energized as the reflective surface 44 of the reflective optical element 26 passes in front of each LED 20.

The operation of light source 14 is dependent on a given projection system and the type of reflective optical element 26 being used. As shown in FIGS. 2A, 3C and 4, light source 14 includes a printed circuit board (PCB) 48 that can be configured to control the function of the LEDs 20. For example, PCB 48 can control the light output of the light source 14 by scaling the number of LEDs 20 that are being utilized for any given application. In addition, the duty cycle of the LEDs 20 is variable and can be controlled to adjust the light output and to reduce the amount of excess heat dissipated by the LEDs 20. For example, the light output may be scaled by adjusting the power to the individual LEDs 20. The power may be applied in a digital format providing either full on or full off functionality. In a digital format, color shading is accomplished by time variations in the duty cycle of the LEDs 20 (i.e., 40% on, 60% off in any period of time). In addition, an analog format may be employed with power variations being accomplished by driving the selected LEDs 20 at a percentage of full power (i.e., 25%).

While the present invention has been particularly shown and described with reference to the foregoing preferred embodiment, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and system within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiment is illustrative, and no single feature or element is essential to all possible combinations that may be claimed in this or a later application.

Where the claims recite "a" or "a first" element of the equivalent thereof, such claims should be understood to include incorporation of one or more such elements, neither requiring nor excluding two or more such elements.

What is claimed is:

1. A projection system configured to project an image-bearing light beam onto a viewing surface, comprising:
   a spatial light modulator; and
   a light source comprising:
   a plurality of light emitting diodes mounted to an inner circle of a ring, said plurality of light emitting diodes forming at least one layer; and
   a reflective optical element centrally positioned within said ring;
   wherein each of said plurality of light emitting diodes selectively generates a light beam directed to said reflective optical element;
   wherein said reflective optical element is multi-faceted with at least three reflective surfaces and generates a light path by collimating and reflecting said selectively generated light beams from each of said plurality of light emitting diodes.

2. The projection system according to claim 1, wherein said plurality of light emitting diodes includes at least one red, one blue, and one green light emitting diode.

3. The projection system according to claim 1, wherein said reflective optical element has a single reflective surface.

4. The projection system according to claim 1, wherein said reflective optical element rotates about a central axis of said ring.

5. The projection system according to claim 1, wherein said reflective optical element rotates about a central axis of said ring.

6. The projection system according to claim 1, wherein said light source further includes a printed circuit board mounted to said ring, said printed circuit board is configured to control an output of light from said light emitting diodes.

7. The projection system according to claim 6, wherein said printed circuit board is configured to control said plurality of light emitting diodes according to a variable duty cycle.

8. The projection system according to claim 6, wherein said printed circuit board is configured to control the number of said plurality of light emitting diodes that are operating in a given cycle.

9. The projection system according to claim 1, wherein said plurality of light emitting diodes forms at least one substantially planar layer with respect to said ring.

10. A light source comprising:
    a plurality of light emitting diodes mounted to an inner circle of a ring; and
    a reflective optical element centrally positioned within said ring;
    wherein each of said plurality of light emitting diodes selectively generates a light beam directed to said reflective optical element;
    wherein said reflective optical element is multi-faceted with at least three reflective surfaces and generates a light path by collimating and reflecting said selectively generated light beams from each of said plurality of light emitting diodes.

11. The light source according to claim 10, wherein said plurality of light emitting diodes includes at least one red, one blue, and one green light emitting diode.

12. The light source according to claim 10, wherein said reflective optical element has a single reflective surface.

13. The light source according to claim 10, wherein said reflective optical element is fixedly positioned within said ring.

14. The light source according to claim 10, wherein said reflective optical element rotates about a central axis of said ring.

15. The light source according to claim 10, wherein said light source further includes a printed circuit board mounted to said ring, said printed circuit board is configured to control an output of light from said light emitting diodes.

16. The light source according to claim 15, wherein said printed circuit board is configured to control said plurality of light emitting diodes according to a variable duty cycle.

17. The light source according to claim 15, wherein said printed circuit board is configured to control the number of said plurality of light emitting diodes that are operating in a given cycle.

18. A method for generating colored light in a projection system, comprising:
   providing a plurality of light emitting diodes along an inner surface of a ring;
   collimating selected light beams generated from said plurality of light emitting diodes inward to a reflective optical element that is multi-faceted with at least three reflective surfaces; and
   reflecting said light beams from said reflective optical element into a co-pointed and co-linear light beam.

19. The method according to claim 18, further comprising rotating said reflective optical element with respect to a central axis of said ring.

20. The method according to claim 18, further comprising controlling a duty cycle of said plurality of light emitting diodes to control an output of light from said plurality of light emitting diodes.

21. A projection system configured to project an image-bearing light beam onto a viewing surface, comprising:
   a spatial light modulator; and
   a light source comprising:
   a plurality of light emitting diodes arranged around the perimeter of a reflective optical element, said reflective optical element is configured to be rotatable about a central axis;
   wherein each of said plurality of light emitting diodes selectively generates a light beam directed to said reflective optical element;
   wherein said reflective optical element is multi-faceted with at least three reflective surfaces and generates a light path by collimating and reflecting said selectively generated light beams from each of said plurality of light emitting diodes.

22. The projection system according to claim 21, wherein said plurality of light emitting diodes includes at least one red, one blue, and one green light emitting diode.

23. The projection system according to claim 21, wherein said plurality of light emitting diodes are pulsed at a low duty cycle to reduce cooling requirements.

24. A light source comprising:
   a plurality of light emitting diodes arranged around the perimeter of a reflective optical element;
   wherein each of said plurality of light emitting diodes selectively generates a light beam directed to said reflective optical element, said reflective optical element is configured to be rotatable about a central axis;
   wherein said reflective optical element is multi-faceted with at least three reflective surfaces and generates a light path by collimating and reflecting said selectively generated light beams from each of said plurality of light emitting diodes.

25. The light source according to claim 24, wherein said plurality of light emitting diodes includes at least one red, one blue, and one green light emitting diode.

26. A method for generating colored light in a projection system, comprising:
   providing a plurality of light emitting diodes arranged around the perimeter of a reflective optical element, said reflective optical element is configured to be rotatable about a central axis;
   collimating selected light beams generated from said plurality of light emitting diodes inward to said reflective optical element that is multi-faceted with at least three reflective surfaces; and
   reflecting said light beams from said reflective optical element into a co-pointed and co-linear light beam.

27. The method according to claim 26, further comprising controlling a duty cycle of said plurality of light emitting diodes to control an output of light from said plurality of light emitting diodes.

* * * * *

UNITED STATES PATENT AND TRADEMARK OFFICE
CERTIFICATE OF CORRECTION

PATENT NO. : 7,506,985 B2
APPLICATION NO. : 11/259202
DATED : March 24, 2009
INVENTOR(S) : George Z. Radominski et al.

Page 1 of 1

It is certified that error appears in the above-identified patent and that said Letters Patent is hereby corrected as shown below:

In column 4, lines 39-40, in Claim 4, delete "rotates about a central axis of said ring." and insert -- is fixedly positioned within said ring. --, therefor.

Signed and Sealed this

Twenty-eighth Day of July, 2009

JOHN DOLL
*Acting Director of the United States Patent and Trademark Office*